(12) United States Patent
Fairy

(10) Patent No.: US 7,731,489 B2
(45) Date of Patent: Jun. 8, 2010

(54) VALVE FOR CO-INJECTION MOLDING APPARATUS

(75) Inventor: Fabrice Fairy, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 243 days.

(21) Appl. No.: 11/958,793

(22) Filed: Dec. 18, 2007

(65) Prior Publication Data

US 2008/0152751 A1 Jun. 26, 2008

Related U.S. Application Data

(60) Provisional application No. 60/871,169, filed on Dec. 21, 2006.

(51) Int. Cl.
*B29C 45/23* (2006.01)
(52) U.S. Cl. .................. 425/130; 425/564; 425/572
(58) Field of Classification Search .................. 425/130, 425/564, 572
See application file for complete search history.

(56) References Cited

U.S. PATENT DOCUMENTS

| | | | |
|---|---|---|---|
| 2,912,719 A | 11/1959 | Gilmore et al. | |
| 3,010,156 A | 11/1961 | Smith | |
| 3,164,863 A | 1/1965 | Hunt | |
| 3,231,938 A | 2/1966 | Seymour | |
| 3,241,191 A | 3/1966 | Nouel | |
| 3,270,115 A | 8/1966 | Nouel | |
| 3,344,477 A | 10/1967 | Stokis | |
| 3,777,990 A | 12/1973 | Herzog | |
| 3,807,914 A | 4/1974 | Paulson et al. | |
| 3,868,061 A | 2/1975 | Hehl | |
| 3,954,209 A | 5/1976 | Ramond | |
| 4,106,887 A | 8/1978 | Yasuike et al. | |
| 4,285,661 A | 8/1981 | Yotsutsuji et al. | |
| 4,289,468 A | 9/1981 | Von Holdt | |
| 4,380,422 A | 4/1983 | Von Holdt | |
| 4,394,117 A | 7/1983 | Taylor | |

(Continued)

FOREIGN PATENT DOCUMENTS

CA 726080 A 1/1966

(Continued)

OTHER PUBLICATIONS

"Priamus Fill & Cool Type 7005A," PRIAMUS eFlowTM Solutions, pp. 1-6.

(Continued)

*Primary Examiner*—Tim Heitbrink
(74) *Attorney, Agent, or Firm*—McDonnell Boehnen Hulbert & Berghoff LLP

(57) ABSTRACT

A coinjection molding apparatus includes at least one manifold having a first manifold melt channel and a second manifold melt channel. A hot runner nozzle is located between the manifold and a mold gate. The nozzle has melt channels communicating with the first manifold melt channel and the second manifold melt channel. A valve has a movable valve member for increasing and decreasing flow of melt in one of the melt channels of the nozzle. The valve member receives a pressure force from the melt. An actuator provides a control force to the valve member. The valve member moves in response to a difference between the pressure force and the control force.

18 Claims, 5 Drawing Sheets

U.S. PATENT DOCUMENTS

| Patent No. | Type | Date | Inventor(s) | Ref |
|---|---|---|---|---|
| 4,560,342 | A | 12/1985 | Ishida et al. | |
| 4,681,528 | A | 7/1987 | Maruyama et al. | |
| 4,747,770 | A | 5/1988 | Schmidt | |
| 4,781,572 | A | 11/1988 | Boring | |
| 4,808,106 | A | 2/1989 | Von Holdt | |
| 5,098,280 | A | 3/1992 | Trakas | |
| 5,125,817 | A | 6/1992 | Yamachika | |
| 5,200,207 | A | 4/1993 | Akselrud et al. | |
| 5,288,225 | A | 2/1994 | Schmidt et al. | |
| 5,378,138 | A | 1/1995 | Onuma et al. | |
| 5,387,099 | A | 2/1995 | Gellert | |
| 5,556,582 | A | 9/1996 | Kazmer | |
| 5,902,614 | A | 5/1999 | Kuntz | |
| 5,927,449 | A | 7/1999 | Huang et al. | |
| 6,074,191 | A * | 6/2000 | Gellert et al. | 425/130 |
| 6,228,309 | B1 | 5/2001 | Jones et al. | |
| 6,254,377 | B1 | 7/2001 | Kazmer et al. | |
| 6,305,563 | B1 | 10/2001 | Elliott | |
| 6,436,320 | B1 | 8/2002 | Kazmer et al. | |
| 6,464,909 | B1 | 10/2002 | Kazmer et al. | |
| 6,683,283 | B2 | 1/2004 | Schmidt | |
| 6,739,863 | B2 | 5/2004 | Olaru | |
| 6,936,199 | B2 | 8/2005 | Olaru | |
| 7,029,268 | B2 | 4/2006 | Doyle et al. | |
| 7,175,420 | B2 | 2/2007 | Babin et al. | |
| 7,192,270 | B2 * | 3/2007 | Babin | 425/572 |
| 7,225,953 | B1 | 6/2007 | Tooman | |
| 7,306,446 | B2 * | 12/2007 | Sabin et al. | 425/130 |
| 7,559,762 | B2 | 7/2009 | Dewar et al. | |
| 2002/0121713 | A1 | 9/2002 | Moss et al. | |
| 2003/0203064 | A1 | 10/2003 | Doughty et al. | |
| 2004/0047935 | A1 | 3/2004 | Moss et al. | |
| 2004/0119182 | A1 | 6/2004 | Kazmer | |
| 2004/0166189 | A1 | 8/2004 | Babin | |
| 2004/0185142 | A1 | 9/2004 | Olaru | |
| 2005/0046082 | A1 | 3/2005 | Dewar | |
| 2005/0255187 | A1 | 11/2005 | Kazmer | |
| 2006/0127527 | A1 | 6/2006 | Doyle et al. | |
| 2006/0145395 | A1 | 7/2006 | Takigawa | |
| 2008/0023862 | A1 | 1/2008 | Niewels et al. | |

FOREIGN PATENT DOCUMENTS

| | | |
|---|---|---|
| DE | 4311196 A1 | 10/1994 |
| DE | 19619882 B4 | 11/1997 |
| DE | 29909535 U | 8/1999 |
| DE | 19811466 A1 | 9/1999 |
| DE | 19857735 A1 | 6/2000 |
| EP | 011805 A1 | 6/1980 |
| EP | 077847 A1 | 5/1983 |
| EP | 891851 A1 | 1/1999 |
| EP | 967063 A1 | 12/1999 |
| EP | 1052078 A1 | 11/2000 |
| EP | 1426160 B1 | 10/2007 |
| JP | 55061438 A | 5/1980 |
| JP | 58142833 A | 8/1983 |
| JP | 61063428 A | 4/1986 |
| JP | 61188118 A | 8/1986 |
| JP | 63166511 A | 7/1988 |
| JP | 4138234 A | 5/1992 |
| JP | 6339951 A | 12/1994 |
| JP | 8156025 A | 6/1996 |
| WO | WO0121377 A1 | 3/2001 |
| WO | WO0160580 A1 | 8/2001 |
| WO | WO03057448 A1 | 7/2003 |
| WO | 2005113215 A | 12/2005 |
| WO | WO2006075857 A1 | 7/2006 |
| WO | WO2006080807 A1 | 8/2006 |

OTHER PUBLICATIONS

Schubert, Art, "The Promise and Practice of Valve Gate Sequencing," RCG, Inc. http://www.rjginc.com/resource_articles.html, pp. 1-8.

Ewikon Brochure 1998—Success with Advanced Technology.

Husky Disclosure Nov. 2001—"Hot Runner with Variable Pressrue Drop," http://www.prioratdatabase.com/IPCOM/000008045/ (2 sheets printed May 25, 2005).

Extended Search Report for application EP 07024534 mailed Mar. 19, 2008.

Extended Search Report for application EP 07011774.2 mailed Mar. 19, 2008.

* cited by examiner

VALVE FOR CO-INJECTION MOLDING APPARATUS

CROSS-REFERENCE TO RELATED APPLICATIONS

This application claims priority to provisional application Ser. No. 60/871,169 which was filed on Dec. 21, 2006 and is herein incorporated by reference.

FIELD

This invention relates generally to an injection molding apparatus, and more particularly to a hot-runner coinjection molding apparatus.

BACKGROUND

Control of melt pressures and flow rates is important to molded part quality and consistency.

SUMMARY

According to one aspect of the present invention, a coinjection molding apparatus includes at least one manifold having a first manifold melt channel and a second manifold melt channel. A hot runner nozzle is located between the manifold and a mold gate. The nozzle has melt channels communicating with the first manifold melt channel and the second manifold melt channel. A valve has a movable valve member for increasing and decreasing flow of melt in one of the melt channels of the nozzle. The valve member receives a pressure force from the melt. An actuator provides a control force to the valve member. The valve member moves in response to a difference between the pressure force and the control force.

BRIEF DESCRIPTION OF THE FIGURES

Embodiments of the present invention will now be described more fully with reference to the accompanying drawings in which.

DETAILED DESCRIPTION

Figure 1:
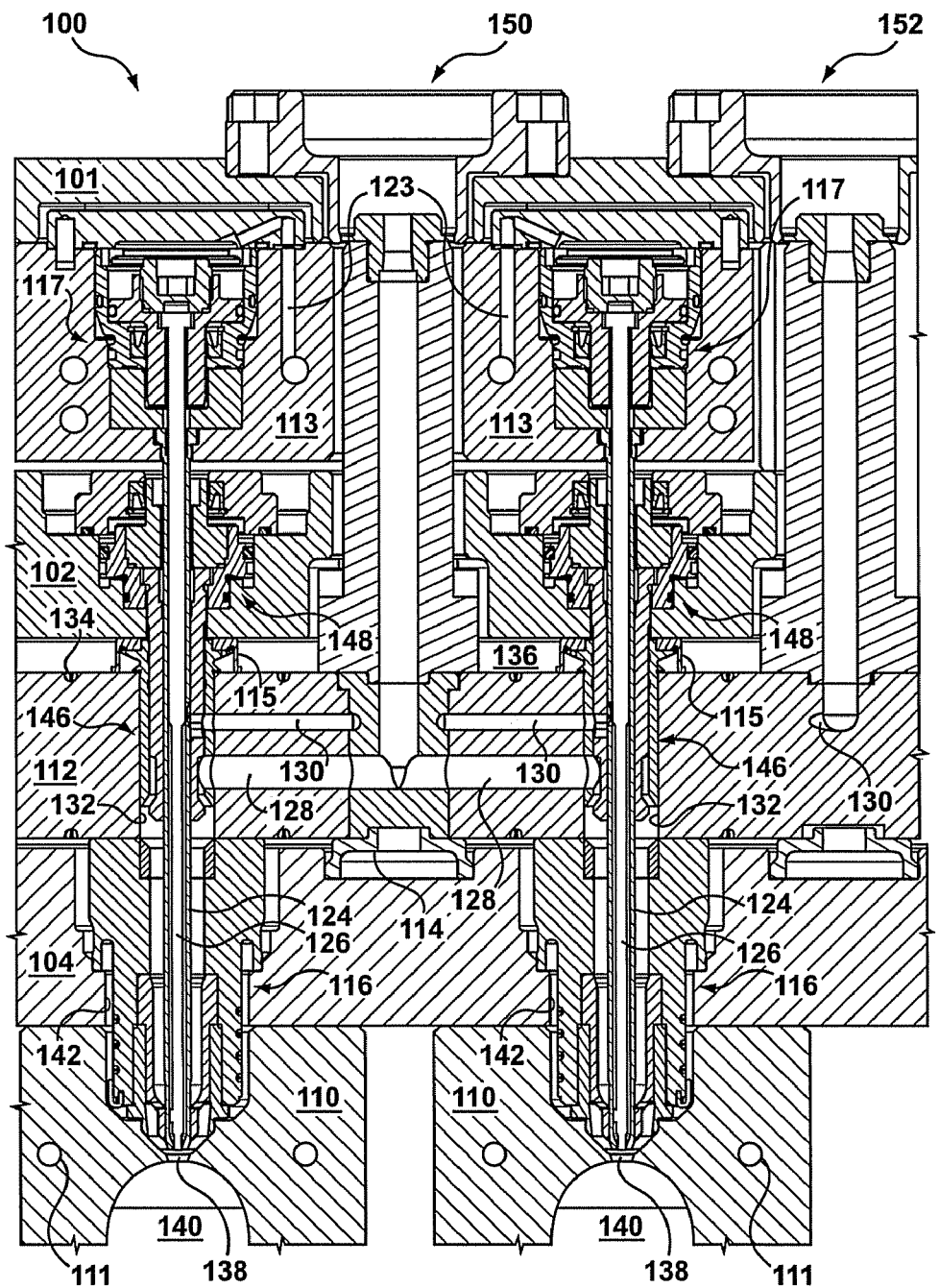
FIG. 1 is a sectional view of an injection molding apparatus according to the invention.

FIG. 1 shows a sectional view of a coinjection molding apparatus 100. The coinjection molding apparatus 100 comprises a backing plate 101, mold plates 102, 104, cavity inserts 110, a yoke plate 113, and a manifold 112. The backing plate 101, mold plates 102, 104, and cavity inserts 110 are stacked. The cavity inserts 110 can have cooling channels 111 for circulating cooling fluid. The yoke plate 113 is surrounded by the mold plate 102 and the backing plate 101. The manifold 112 is located on the mold plate 104 by a locating ring 114 and separated from the mold plate 102 by valve discs 115. The coinjection molding apparatus 100 further comprises a pair of nozzles 116 disposed within the mold plate 104 and cavity inserts 110. Each nozzle 116 is adapted to receive a sleeve 124 and a pin 126 (not hatched in the figures). Disposed in the yoke plate 113 are two actuators 117, each for actuating the pin 126 of the respective nozzle 116. The yoke plate 113, in which the tops of the sleeves 124 are fixed, is also moveable by at least an actuator (not shown). The yoke plate 113 comprises at least a fluid channel 123 for feeding the attached actuators 117. Coupled to the valve discs 115 and disposed within the manifold 112 are valves 146, which are controlled by actuators 148 that are disposed within the mold plate 102.

In the coinjection molding apparatus 100, two nozzles 116 and two sets of related components merely serve as an example, and more or fewer nozzles and sets of related components could readily be used without altering the principles of the invention. Moreover, the backing plate 101, mold plates 102, 104, and cavity inserts 110 are shown as an example. More or fewer plates could be used, depending on specific applications. The number of plates, kinds of plates, and the materials of which the plates are made are not central to the invention.

In the following, the direction of molding material flow from the manifold 112 to the cavity inserts 110 is known as downstream, while the opposite direction is known as upstream. Forward means the direction from the backing plate 101 to the cavity inserts 110 and rearward means the opposite direction. However, the orientation, geometry, and structure of the coinjection molding apparatus 100 are not limited by these terms.

Disposed among the mold plates 102, 104 is the manifold 112, which comprises a first manifold melt channel 128, a second manifold melt channel 130, and guide bores 132 in which are disposed the valves 146. The manifold melt channels 128, 130 are independent and do not communicate with each other, such that different melts or resins or other molding materials do not mix in the manifold 112. The manifold melt channels 128, 130 are fed by respective sprues 150, 152 connected to one or more molding machines (not shown) or other molding material sources. The lengths, diameters or widths, and general geometry of the manifold melt channels 128, 130 depend on the specific application and the amounts and natures of the molding materials. In this embodiment, both manifold melt channels 128, 130 are cylindrical bores and the first manifold melt channel 128 is of a larger diameter than the second manifold melt channel 130, although other melt channel shapes and sizes are equally suitable. It is known to make manifolds out of a single plate, a group of plates (with different melt channels in different plates), piping or tubing, and modular bars, and the manifold 112 could equally be any of these kinds of manifolds. For example, in another embodiment the manifold 112 can comprise two separate plates, each having one of the manifold melt channels 128, 130 therein. In addition, the manifold 112 is provided with a heater 134. Generally, when used as part of a hot-runner application, the manifold 112 is heated and separated from the surrounding mold plates by an insulating air space 136.

In this embodiment, the nozzles 116 feed mold cavities 140 of the cavity inserts 110 through mold gates 138. In the cavities 140 molding material is solidified to form an injection molded product (not shown). In other embodiments, mold inserts or gate inserts can be provided in the mold plate 104 or in the cavity inserts 110.

Figure 2:
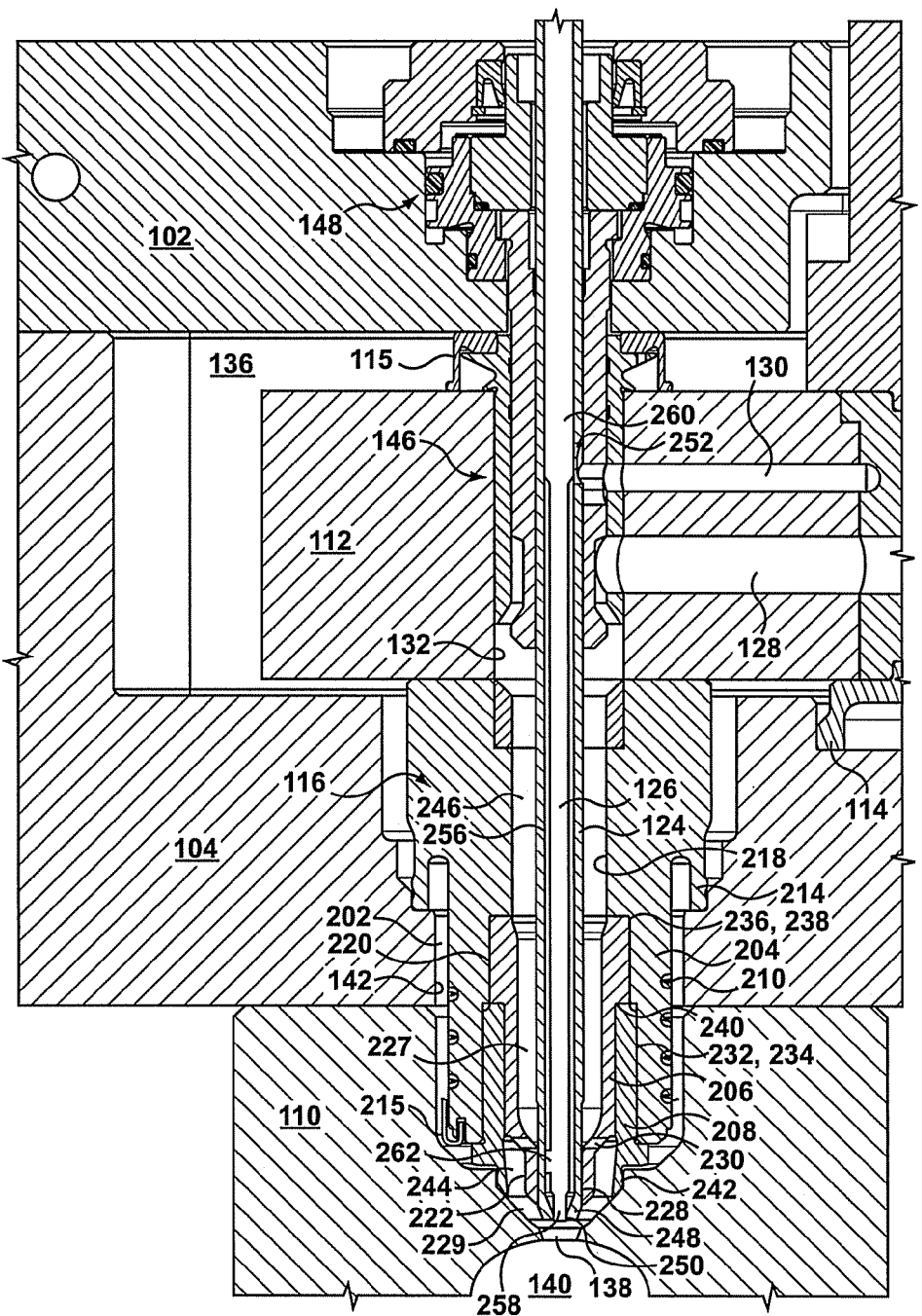
FIG. 2 is a sectional view of mainly a nozzle of FIG. 1.

As shown in the sectional view of FIG. 2, coupled to the manifold 112 are the nozzles 116, each of which is disposed in a well 142 formed in the mold plate 104 and respective cavity insert 110. The well 142 is larger than the nozzle 116 such that an insulating air space 202 is created around the nozzle 116, so that heat in the nozzle 116 is not readily lost to the mold plate 104 or cavity insert 110. The nozzle 116 comprises a nozzle body 204, a nozzle tip 206, and a tip retaining piece 208 that connects the nozzle tip 206 to the nozzle body 204. The nozzle 116 further comprises a spirally wound heater 210 (e.g., an electric heater, partially shown) having varying pitch and embedded in the nozzle body 204 from the head to the area of the nozzle tip 206. A nozzle flange 214 is provided at the head of the nozzle body 204 and serves to support the nozzle 116 in the mold plate 104. To measure the temperature of the nozzle 116 or molding material therein, a thermocouple 215 may be situated inside a thermocouple well.

The nozzle body 204 is generally cylindrical and comprises a longitudinal bore 218, which is also generally cylindrical. The longitudinal bore 218 of the nozzle 116 is aligned with the guide bore 132 of the manifold 112.

The nozzle tip 206 is disposed in a frontal bore 220 of the nozzle body 204 and comprises an alignment portion 222. The nozzle tip 206 can be made of a single piece or multiple pieces. The nozzle tip 206 has a nozzle tip melt channel 227 in communication with the longitudinal bore 218 of the nozzle body 204. The nozzle tip 206 is set back from the cavity insert 110 such that a forward melt area 229 exists.

In this embodiment, the alignment portion 222 has an alignment bore 228. The nozzle tip 206 further comprises a plurality of release melt channels 230 disposed upstream of the alignment portion 222, with one release melt channel 230 being the minimum number required and the maximum simply limited by geometry, molding material, and the desired structural integrity of the nozzle tip 206. Each release melt channel 230 can be said to be lateral in that it allows molding material to flow sideways relative to the general flow of molding material in the nozzle tip 206. Each release melt channel 230 need not be precisely lateral and can be at an angle instead. Each release melt channel 230 can be a bore, a slit, a hole, an opening, or any other type of channel structure. The plurality of release melt channels 230 may be of different sizes or shapes or of the same size or shape.

The tip retaining piece 208 has threads 232 that are mated into corresponding threads 234 of the nozzle body 204, and in this way retains the nozzle tip 206 in the nozzle body 204. The retaining is assisted by a concave shoulder 236 in the nozzle body 204 and a corresponding convex shoulder 238 on the nozzle tip 206 and by the shape of the contact area 240 between the corresponding surfaces of the nozzle tip 206 and the tip retaining piece 208. Other coupling schemes, such as brazing, could also be used. The tip retaining piece 208 further comprises a sealing portion 242 that fits or seals against the cavity insert 110 and prevents molding material from entering the insulating air space 202.

An annular melt channel 244 exists between the tip retaining piece 208 and the alignment portion 222 of the nozzle tip 206, the annular melt channel 244 circumferentially surrounding a portion of the nozzle tip 206 that is downstream of the release melt channels 230. The one or more release melt channels 230 provide molding material communication between the nozzle tip melt channel 227 and the annular melt channel 244. The annular melt channel 244 communicates molding material from the release melt channels 230 to the forward melt area 229, which can communicate with the mold gate 138.

Running through the manifold 112 and the nozzle 116 are the sleeve 124 and the pin 126 disposed within the sleeve 124. The sleeve 124 is sometimes known as a sleeve pin, and the pin 126 is sometimes called a valve pin or a needle.

The sleeve 124 is disposed within the valve 146, the longitudinal bore 218 of the nozzle body 204, and the nozzle tip melt channel 227 of the nozzle tip 206. The sleeve 124 has a hollow section and is narrower than the guide bore 132, the longitudinal bore 218, and the nozzle tip melt channel 227, thus defining an outer melt channel 246 between the sleeve 124 and the nozzle body 204 as well as between the sleeve 124 and the manifold 112 and nozzle tip 206. The sleeve 124 can have stepped diameters, such that the sleeve 124 is narrower at the nozzle tip 206 than at the yoke plate 113. The outer melt channel 246 communicates with the first manifold melt channel 128 via an outlet of the first manifold melt channel 128. In this embodiment, the outer melt channel 246 has an annular cross-section. The sleeve 124 has a tip portion 248 and an opening 250 in the tip portion 248. In this embodiment the tip portion 248 is a narrowed or pointed section of the sleeve 124 and the opening 250 is a central opening in such narrowed section. The sleeve 124 is slidably disposed in the valve 146 in the guide bore 132, and the sleeve 124 can slide or reciprocate to open and close melt communication of the outer melt channel 246 to the mold gate 138 with the tip portion 248. As such, the sleeve 124 can be said to have opened and closed positions. The position of the sleeve 124 is controlled by the yoke plate 113, which can move forward and rearward. The sleeve 124 also has a lateral opening 252 near the second manifold melt channel 130 to allow molding material to flow from the second manifold melt channel 130 to the inner melt channel 256.

The alignment portion 222, and more specifically in this embodiment, the alignment bore 228 of the nozzle tip 206 aligns or guides the sleeve 124 over the sliding range of movement of the sleeve 124 to prevent lateral deflection of sleeve 124 during sliding. This aligning or guiding function of the alignment portion 222 (alignment bore 228) can reduce wear of the mold gate 138 caused by the sleeve 124 and can further improve injection technique. The alignment bore 228 can also prevent resistance against movement of the sleeve 124. Additionally, an inside surface of the alignment bore 228 can be coated with a coating that aids in the movement (a friction-reducing coating), reduces wear to the alignment bore 228 (a wear-resistant coating), and/or improves alignment of the sleeve 124 with respect to the mold gate 138. The coating can be, but is not limited to, a nickel-based material. The coating can also be implemented to improve the hardness of the alignment portion 222 surface in contact with the sleeve 124. In addition, the fit between sleeve 124 and alignment bore 228 is configured to prevent molding material from flowing between the sleeve 124 and the alignment bore 228.

In addition, as controlled by the position of the sleeve 124, the nozzle tip 206 distributes molding material from the outer melt channel 246 through release melt channels 230 and to the annular melt channel 244, such that the flow, velocity, and/or pressure of the molding material are balanced. This can result in an even and balanced flow of the molding material.

The pin 126 is disposed within the hollow section of the sleeve 124. The pin 126 has a section narrower than the hollow section of the sleeve 124, thus defining an inner melt channel 256 between the pin 126 and the sleeve 124. The pin 126 can have stepped diameters, such that the pin 126 is narrower at the nozzle tip 206 than at the yoke plate 113. The inner melt channel 256 can communicate with the second manifold melt channel 130 via an outlet of the second manifold melt channel 130. In this embodiment the inner melt channel 256 has an annular cross-section. The pin 126 comprises a tip 258. The pin 126 is slidably disposed in the sleeve 124 by virtue of an upper section 260 that slidably mates with the inner wall of the hollow section of the sleeve 124. The pin 126 can slide or reciprocate to open and close melt communication of the inner melt channel 256 to the opening 250 of the sleeve 124 with the tip 258 of the pin 126. The opened and closed positions of the pin 126 are with respect to the sleeve 124 and are controlled by the actuator 117 disposed within the yoke plate 113. From the frame of reference of, say, the nozzle body 204, the pin 126 actually has three positions. The pin 126 can further have at least one fin 262 that contacts the inner wall of the hollow section of the sleeve 124 to align the pin 126 within the sleeve 124.

In FIGS. 1 and 2, the sleeve 124 is illustrated in the opened position and the pin 126 is illustrated in the closed position. In operation, the sleeve 124 and pin 126 are moved between their opened and closed positions by way of the movable yoke plate 113 and the actuator 117 to control melt flow into the cavity 140. Any number of opening and closing sequences can be used.

Figure 3A:
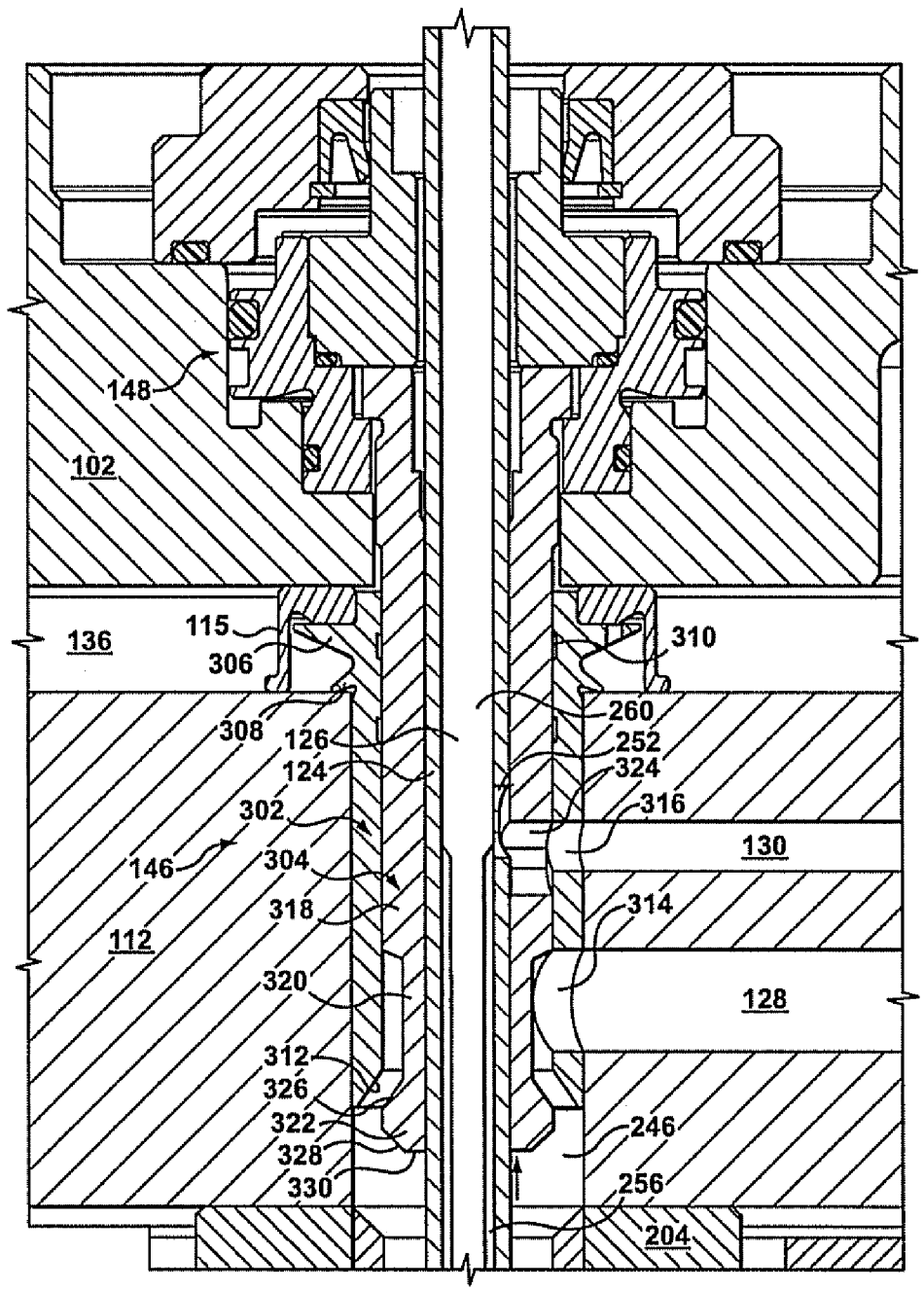
FIGS. 3a-b are sectional views of the valve of FIG. 1.
Figure 3B:
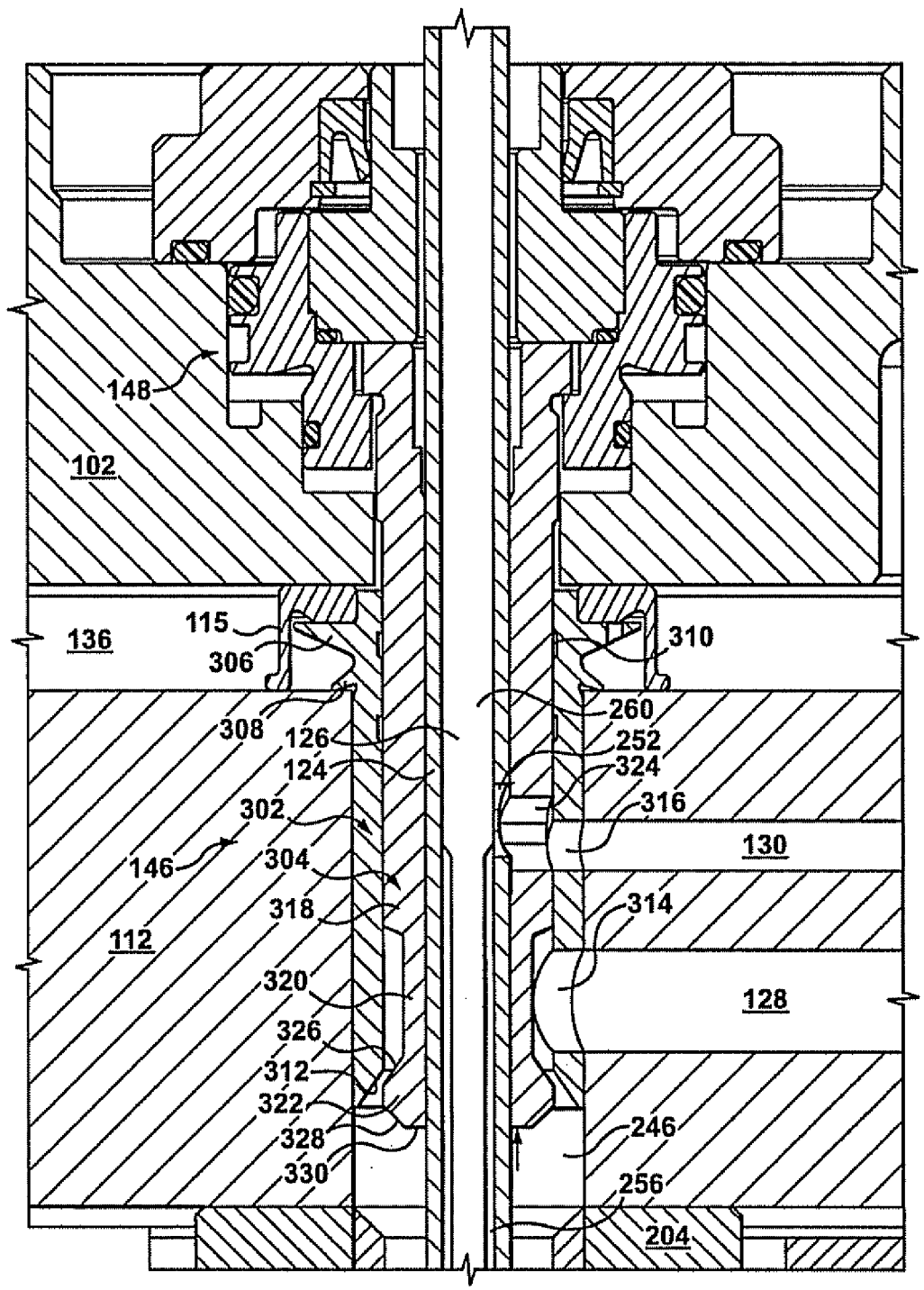

The valve 146 (which may also be called a self-regulating valve) can best be seen in FIGS. 3a-b. The valve 146 comprises a support extension 302 and a hollow control rod 304 (or "valve member"). The valve disc 115 may also be considered part of the valve 146; and in fact, the valve disc 115 and support extension 302 can be made of a unitary piece. The valve disc 115 could also be replaced by one or more independent spacers. In FIG. 3a, the hollow control rod 304 is shown in an open position. In FIG. 3b, the hollow control 304 rod is shown in a closed position.

The support extension 302 is a hollow, generally tubular piece that is fixed in place and extends from the air space 136 to the forward part of the manifold 112. At the rearward end of the support extension 302, a flange 306 can be provided to mate with the valve disc 115, another flange 308 can be provided to seal against the manifold 112, and at least a groove 310 can be provided to trap melt to seal against the control rod 304. A beveled surface 312 is provided at the forward end of the support extension 302. The beveled surface 310 can be flat, curved, or irregularly shaped, and preferably tapers inward as it extends towards the rearward section of the manifold 112. The support extension 302 further comprises a first melt opening 314 aligned with the outlet of the first manifold melt channel 128 and a second melt opening 316 aligned with the outlet of the second manifold melt channel 130. The first melt opening 314 allows melt from the first manifold melt channel 128 to reach the outer melt channel 246. The second melt opening 316 allows melt from the second manifold melt channel 130 to reach the inner melt channel 256.

The hollow control rod 304 is a generally tubular piece that is slidably disposed within the support extension 302 and extends from the actuator 148 to the forward part of the manifold 112. The hollow control rod 304 is hollow in order to accommodate the sleeve 124 and pin 126, which extend through it and rearward through the actuator 148 as well. The hollow control rod 304 comprises a full section 318, a narrowed section 320, and an enlarged valve portion 322. The full section 318 is made with an outer diameter to slidably mate with the support extension 302. The full section 318 comprises a melt opening 324 that allows melt from the second manifold melt channel 130 to reach the inner melt channel 256. The melt opening 324 can be a bit wider than the second manifold melt channel 130 to account for the movement of the hollow control rod 304 (i.e., to allow delivery of melt regardless of position). The narrowed section 320 is located between the full section 318 and the enlarged valve portion 322 and of an outer diameter narrower than diameters of the full section 318 and the enlarged valve portion 322. The narrowed section 320 allows melt from the first manifold melt channel 128 to reach the outer melt channel 246. The inner diameters of the full section 318, the narrowed section 320, and the enlarged valve portion 322 are substantially the same and accommodate the slidable sleeve 124 therein.

The enlarged valve portion 322 is located near the beveled surface 312 of the support extension 302, and can have the same or different outer diameter as the full section 318. The enlarged valve portion 322 comprises a rearward surface 326, a first forward surface 328, and a second forward surface 330. The rearward surface 326 is near the beveled surface 312 of the support extension 302. When the position of the enlarged valve portion 322 changes, the volume of the annular melt path between the rearward surface 326 and the beveled surface 312 changes. In this way, the position of the hollow control rod 304 within the support extension 302 can control the flow of melt from the first manifold melt channel 128 into the outer melt channel 246, and ultimately into the cavity 140. The overall shape of the enlarged valve portion 322 can be different from that described and need not even be axially symmetric, but the enlarged valve portion 322 should generally be of larger outer diameter than the narrowed section 320. The shapes of the enlarged valve portion 322 and the support extension 302 as a whole are not critical, but should be selected in an effort to reduce shear forces exerted by the flowing melt.

The rearward surface 326 can be flat, curved, or irregularly shaped, and preferably tapers inward as it extends towards the rearward section of the manifold 112. The first forward surface 328 and the second forward surface 330 can also be flat, curved, or irregularly shaped. The first forward surface 328 and the second forward surface 330 can also be the same surface.

The actuator 148 is a hydraulic, pneumatic, or electric actuator that can exert a control force on the hollow control rod 304. The actuator 148 is configured to apply a forward force to the hollow control rod 304, thereby tending to push the hollow control rod 304 in the direction of melt flow (forward). This action tends to enlarge the annular melt path between the rearward surface 326 and the beveled surface 312.

The melt in the first manifold melt channel 128 and in the outer melt channel 246 exerts a pressure force on the hollow control rod 304 as well. The net effect of the pressure force is to tend to push the hollow control rod 304 in a direction opposite melt flow (rearward, as shown by the arrow). The first and second forward surfaces 328, 330 can be viewed as receiving the net pressure force (with pressures on other surfaces cancelling each other). This action tends to constrict the annular melt path between the rearward surface 326 and the beveled surface 312. When shapes of the enlarged valve portion 322 and the support extension 302 as a whole are well designed, shear forces exerted by the flowing melt, which tend to act opposite the pressure force, become negligible or insignificant.

When the forward control force from the actuator 148 exceeds the rearward pressure force from the melt, the hollow control rod 304 will move forward, thereby enlarging the annular melt path between the rearward surface 326 and the beveled surface 312, and thus increasing the flow of melt into the outer melt channel 246 and consequently increasing the rearward pressure force. The hollow control rod 304 will move forward until the forward control force is balanced by the increasing rearward pressure force or until the physical limit of the movement is reached.

Likewise, when the rearward pressure force from the melt exceeds the forward control force from the actuator 148, the hollow control rod 304 will move rearward, thereby constricting the annular melt path between the rearward surface 326 and the beveled surface 312, and thus decreasing the flow of melt into the outer melt channel 246 and consequently decreasing the rearward pressure force. The hollow control rod 304 will move rearward until the decreasing rearward pressure force is balanced by the forward control force or until the physical limit of the movement is reached.

Any difference between the rearward pressure force from the melt and the forward control force from the actuator 148 causes the hollow control rod 304 to move until the rearward pressure force and forward control force reach equilibrium, resulting in regulation of the melt pressure in the outer melt channel 246. In this way, the actuator 148 governs downstream melt pressure. When the actuator 148 is a hydraulic or pneumatic actuator, there is a direct relationship between the source pressure for the actuator 148 and the melt pressure downstream of the hollow control rod 304. If the actuator 148 is an electric actuator, there may be a direct relationship between actuator power and the melt pressure downstream of the hollow control rod 304.

The valve 146 reduces if not nearly eliminates the effects of fluctuating melt pressure in the first manifold melt channel 128, as long as the melt pressure in the first manifold melt channel 128 is suitably high (i.e., at least equal to the maximum desired cavity pressure). In an apparatus with more than one nozzle, a valve and associated actuator can be provided to each nozzle so that the pressure and melt flow through each nozzle can be independently controlled, despite the fact that the melt source (i.e., injection molding machine) may be common to many or all of the nozzles. The valve 146 being independent from the sleeve 124 means that any forces acting on the sleeve 124 do not significantly affect operation of the valve 146, e.g., movement of the hollow control rod 304 is not significantly affected by melt shear forces on the sleeve 124 and vice versa.

The physical limits of the movement of the hollow control rod 304 can be seen in FIGS. 3*a-b*; however, these limits are not critical. The hollow control rod 304 can be made to open melt flow more than shown in FIG. 3*a*, and can also be made to close melt flow more than shown in FIG. 3*b*, even to the point of completely closing off melt flow.

Figure 4:
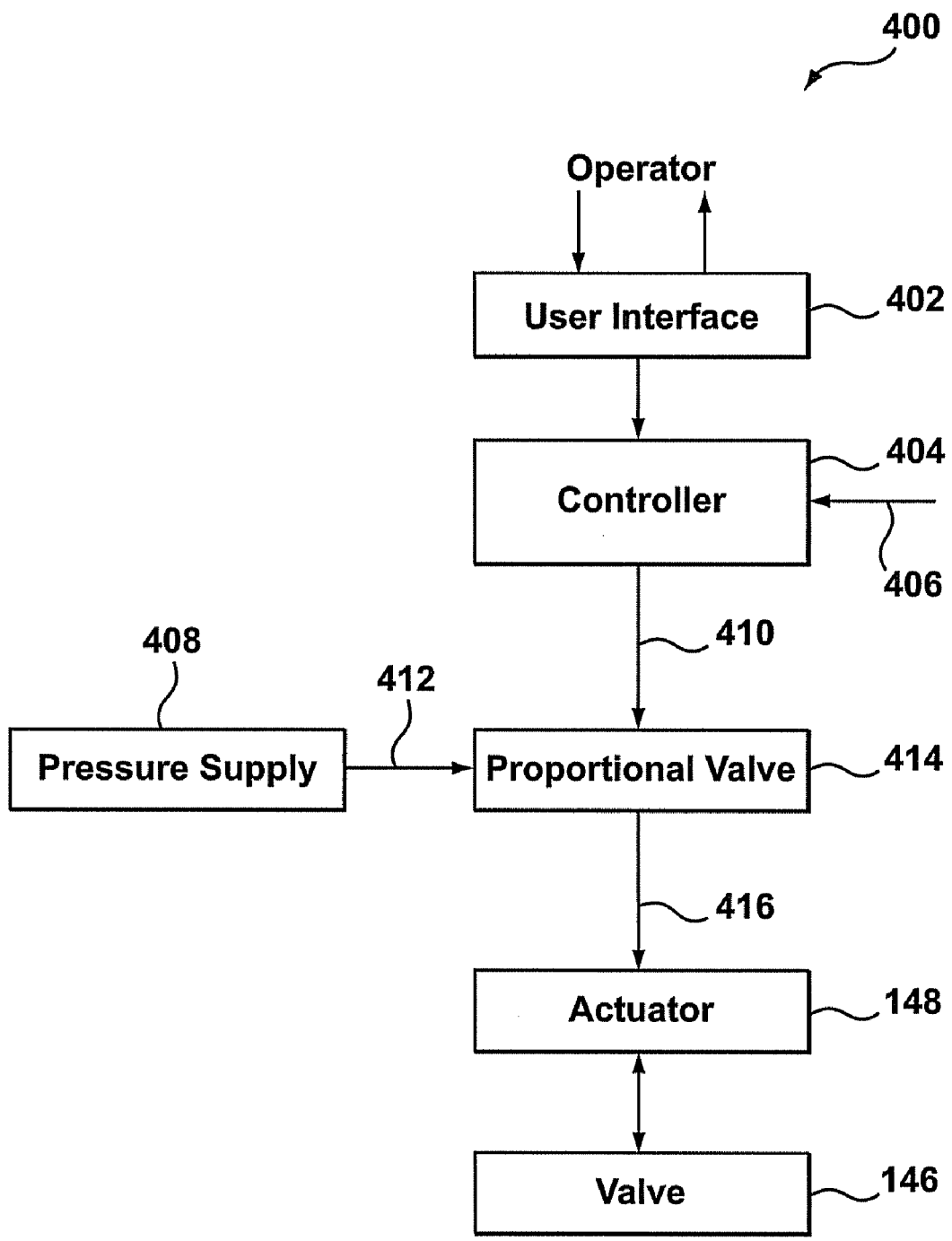
FIG. 4 is a block diagram of a system for controlling the valve of FIG. 1.

FIG. 4 shows a block diagram of a system 400 for controlling the valve described above. The system 400 includes a user interface 402, a controller 404, a pressure supply 408, a proportional valve 414, an actuator 148, and a valve 146. More that one set of a proportional valve 414, an actuator 148, and a valve 146 can be used, and these sets can all be connected to the same controller 404 and pressure supply 408. Each set can be used for each nozzle of a hot-runner of an injection molding apparatus.

The user interface 402 can be any input/output device that allows communication of data between an operator and controller 404. The user interface 402 can include a keyboard, display, a touch screen, a voice activated device, retinal following device, a virtual keyboard, or similar device.

The controller 404 can include a processor, a microprocessor, a computer system, or the like, that is coupled to underlying software and external devices in order to receive, store, process, generate, and/or transmit data.

In operation, at a start of a molding cycle, the controller 404 receives a signal 406 from a molding machine (not shown), indicating the molding cycle has started. Upon receipt of the signal 406, the controller 404 generates a control signal 410 to the proportional valve 414. For example, the signal 410 can include information relating to a pressure profile for a current molding cycle for that proportional valve 414 receiving the signal 410. In one example, the pressure profile is a range of different electronic voltage magnitudes, which correlate to pressures. The pressure profile can be downloaded, stored, and/or received at controller 404 via an internal (intranet) or external (Internet) wired or wireless network. Thus, when multiple nozzles are used, each having a proportional valve 414, an actuator 148, and a valve 146, a corresponding plurality of signals 410 can be generated, individualized for each nozzle, and the melt pressure and flow for each nozzle can be independently regulated, which is particularly advantageous for systems with many cavities or systems with different shaped cavities.

The proportional valve 414 uses the signal 410 to generate an actuator pressure 416 from the pressure supply 408. The proportional valve 414 may be linear such that an increase in the signal 410 corresponds directly to an increase in the actuator pressure 416.

The actuator 148 converts the actuator pressure 416 to the above-described control force that is applied to the valve 146. Since the control force is balanced by melt pressure, the pressure of the melt in the outer melt channel 246 (see FIG. 3) is proportional to the output of the proportional valve 414. Thus, melt pressure in a nozzle (e.g., nozzle 116) is proportional to the electrical signal 410 provided by the controller 404. In this way, the operator can independently regulate the pressure of the melt for each nozzle in a hot-runner of an injection molding apparatus.

Although preferred embodiments of the present invention have been described, those of skill in the art will appreciate that variations and modifications may be made without departing from the spirit and scope thereof as defined by the appended claims. All patents and publications discussed herein are incorporated in their entirety by reference thereto.

What is claimed is:

1. A coinjection molding apparatus comprising:
    at least one manifold having a first manifold melt channel and a second manifold melt channel;
    a hot runner nozzle located between the manifold and a mold gate, wherein the nozzle has melt channels communicating with the first manifold melt channel and the second manifold melt channel;
    a valve having a movable valve member for increasing and decreasing flow of melt in one of the melt channels of the nozzle, the valve member receiving a pressure force from the melt; and
    an actuator providing a control force to the valve member, wherein the valve member moves in response to a difference between the pressure force and the control force, wherein when the control force exceeds the pressure force, the valve member moves to enlarge a melt path and increase the pressure force; and when the pressure force exceeds the control force, the valve member moves to constrict the melt path and decrease the pressure force, wherein when the control force exceeds the pressure force, the valve member moves to enlarge a melt path and increase the pressure force; and when the pressure force exceeds the control force, the valve member moves to constrict the melt path and decrease the pressure force.

2. The coinjection molding apparatus of claim 1, wherein the valve member is a hollow control rod.

3. The coinjection molding apparatus of claim 2, wherein the valve further comprises a support extension fixed to the manifold, and the hollow control rod is slidably disposed within the support extension.

4. The coinjection molding apparatus of claim 3, wherein the support extension comprises a first melt opening aligned with an outlet of the first manifold melt channel and a second melt opening aligned with an outlet of the second manifold melt channel.

5. The coinjection molding apparatus of claim 3, wherein the hollow control rod comprises a full section, a narrowed section, and an enlarged valve portion, wherein the full section has an outer diameter to slidably mate with the support extension, the narrowed section is located between the full section and the enlarged valve portion, and the narrowed section has an outer diameter narrower than the outer diameters of the full section and the enlarged valve portion; and wherein the inner diameters of the full section, the narrowed section, and the enlarged valve portion are substantially the same and accommodate a slidable sleeve therein.

6. The coinjection molding apparatus of claim 3, wherein the control force tends to push the hollow control rod in a direction of melt flow, which tends to enlarge a melt path between the hollow control rod and the support extension.

7. The coinjection molding apparatus of claim 3, wherein the pressure force tends to push the hollow control rod in a direction opposite melt flow, which tends to constrict a melt path between the hollow control rod and the support extension.

8. The coinjection molding apparatus of claim 1, further comprising a sleeve defining an outer melt channel within the nozzle, the outer melt channel communicating with the first manifold melt channel, the sleeve being slidable to open and close melt communication of the outer melt channel to the mold gate.

9. The coinjection molding apparatus of claim 8, further comprising a yoke plate to which the sleeve is fixed, the yoke plate being moveable by a second actuator.

10. The coinjection molding apparatus of claim 8, further comprising a nozzle tip that aligns or guides the sleeve over the sliding range of movement of the sleeve.

11. The coinjection molding apparatus of claim 8, further comprising a pin slidably disposed within a hollow section of the sleeve, the pin defining an inner melt channel between the pin and the sleeve, the inner melt channel capable of communicating with the second manifold melt channel, the pin being slidable to open and close melt communication of the inner melt channel to an opening of the sleeve.

12. The coinjection molding apparatus of claim 11, further comprising a second actuator for controlling the position of the pin.

13. The coinjection molding apparatus of claim 11, wherein the valve member is a hollow control rod through which the sleeve and pin extend.

14. The coinjection molding apparatus of claim 8, wherein the valve member is a hollow control rod through which the sleeve extends.

15. The coinjection molding apparatus of claim 1, further comprising a controller, a pressure supply, and a proportional valve, wherein the controller controls the proportional valve to generate an actuator pressure from the pressure supply, wherein the actuator converts the actuator pressure into the control force.

16. A coinjection molding apparatus comprising:
at least one manifold having a first manifold melt channel having a first outlet for guiding and delivering a first molten material and a second manifold melt channel having a second outlet for guiding and delivering a second molten material;
a valve located in the proximity of one of the first outlet or the second outlet, said valve having a movable valve member that increases or decreases the amount of melt flowing towards a mold gate;
a hot runner nozzle located between the manifold and the mold gate, wherein said nozzle has a first melt channel to receive the first molten material and a second melt channel to receive the second molten material; and
a pin movable within the nozzle that controls the flow of the first and second molten materials to the mold gate.

17. A coinjection molding apparatus comprising:
a manifold comprising a guide bore;
a nozzle coupled to the manifold, the nozzle having a nozzle body;
a valve comprising a support extension fixed within the guide bore and a hollow control rod having an enlarged valve portion, the hollow control rod being slidably disposed within the support extension;
an actuator connected to the hollow control rod;
a sleeve comprising a tip portion having an opening therein, the sleeve being slidably disposed within the hollow control rod, an outer melt channel located between the sleeve and the nozzle body; and
a pin comprising a tip, the pin being slidably disposed within the sleeve, an inner melt channel located between the pin and the sleeve;
wherein the hollow control rod moves within the outer melt channel according to melt pressure within the outer melt channel acting on the enlarged valve portion and according to an control force of the actuator, the position of the hollow control rod affecting the melt pressure within the outer melt channel.

18. The coinjection molding apparatus of claim 17, wherein when the control force exceeds a pressure force of melt pressure within the outer melt channel acting on the enlarged valve portion, the hollow control rod moves to enlarge the outer melt channel and increase the pressure force; and when the pressure force exceeds the control force, the hollow control rod moves to constrict the outer melt channel and decrease the pressure force.

* * * * *

UNITED STATES PATENT AND TRADEMARK OFFICE
CERTIFICATE OF CORRECTION

PATENT NO. : 7,731,489 B2
APPLICATION NO. : 11/958793
DATED : June 8, 2010
INVENTOR(S) : Fabrice Fairy It is certified that error appears in the above-identified patent and that said Letters Patent is hereby corrected as shown below:

Claim 1, Column 8, lines 48-53: please delete the phrase ", wherein when the control force exceeds the pressure force, the valve member moves to enlarge a melt path and increase the pressure force; and when the pressure force exceeds the control force, the valve member moves to constrict the melt path and decrease the pressure force"

Signed and Sealed this

Twenty-seventh Day of July, 2010

David J. Kappos
*Director of the United States Patent and Trademark Office*